(12) United States Patent
Yu

(10) Patent No.: US 6,548,118 B1
(45) Date of Patent: Apr. 15, 2003

(54) METHOD OF FORMING A COMPLETE FAR INFRARED RADIATION ON THE SURFACE OF CERAMIC WARES AND ITS PRODUCT THEREOF

(76) Inventor: Chun-Ming Yu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/659,328

(22) Filed: Sep. 12, 2000

(51) Int. Cl.$^7$ ................................................. B05D 3/02
(52) U.S. Cl. ...................................................... 427/376.2
(58) Field of Search ....................................... 427/376.2

(56) References Cited

U.S. PATENT DOCUMENTS

| | | | | |
|---|---|---|---|---|
| 4,294,635 A | * | 10/1981 | Hurley, Jr. ................ | 156/89 |
| 5,147,435 A | * | 9/1992 | Kubota et al. ............ | 65/30.1 |
| 5,238,881 A | * | 8/1993 | Norris ....................... | 501/20 |
| 5,985,228 A | * | 11/1999 | Corrigan et al. .......... | 423/290 |

FOREIGN PATENT DOCUMENTS

| | | | |
|---|---|---|---|
| JP | 1-208342 A | * | 8/1989 |
| JP | 11-35340 A | * | 2/1999 |

OTHER PUBLICATIONS

Abstract of TW 217999 A, published Dec. 1993.*
Abstract of CN 1141265 A, published Jan. 1997.*

* cited by examiner

*Primary Examiner*—Michael Barr
(74) *Attorney, Agent, or Firm*—Troxell Law Office PLLC

(57) ABSTRACT

The method of forming a complete far infrared on the surface of ceramic wares and its product thereof, mainly using a baked far infrared conversion powdered material and mixing it in an easily soluble glaze, and smearing the mixture onto the surface of the unfired clay; after firing, the baked conversion powered material will adhere on the outermost glazed surface due to the suspension action. Such arrangement of coating a conversion layer on the outmost surface gives a complete radiation and ensures a complete light wave effect.

2 Claims, 1 Drawing Sheet

METHOD OF FORMING A COMPLETE FAR INFRARED RADIATION ON THE SURFACE OF CERAMIC WARES AND ITS PRODUCT THEREOF

BACKGROUND OF THE INVENTION

1. Field of the Invention

The present invention relates to a method of forming a complete far infrared radiation on the surface of ceramic wares and its product thereof, more particularly to a method of coating a compete layer of radioactive far infrared matter on the outmost surface of the ceramic wares and its product thereof.

2. Description of the Prior Art

With regard to the application of far infrared rays, we use such far infrared rays to activate the water molecules in a fluid, for example, using the activity of such molecules to effectively produce an enclosure effect such as to produce a ball-shaped surrounding around ethyl alcohol and the organic matter of the insecticides, therefore it can have a capturing effect on such organic substances. Furthermore, after activating the molecular activity of the fluid, it increases the melting ability for other organic matters or it has a direct penetrative vibration inside the food with water content, and further changes the texture of the food and keeps the food fresh, or it can purify the human blood after forming a resonance activity to the water molecules inside human blood, or effectively excrete the impurities. The wavelength of such far infrared ray is about 7 to 14μ which is most effective to human bodies, and such wavelength and fluid molecules are able to generate the same kind of resonance effect that makes the accumulative energy to reach the increasing vibration energy and the water molecules to an effectively active level. As soon as the far infrared ray has been found to have good effects to human bodies, there are many products making use of its application and implementing the far infrared conversion design such as the far infrared ray illuminator, heating pad, health appliances and the like. The far infrared ray also can be applied to ceramic wares. However, the application of the far infrared ray to ceramic wares has to reach certain applicable wavelength, therefore it must possess the conversion powdered material of the same wavelength. General applications of far infrared ray on ceramics at an earlier stage in the past is to mix the far infrared powdered material into the raw material of the unfired body, then shape or model the unfired body, and finally proceed with firing. Since the interior of unfired body is completely mixed with the far infrared powdered material, the implementation performance is not a substantial conversion, therefore it is very wasteful, and it is not able to control the coloring effectively or an easy conversion. It does not allow a colorful glaze. Mixing the far infrared material in the glaze needs to be improved. Since the conversion powdered material is composed of metallic oxides such as aluminum oxide, ferric oxide, zirconium oxide, etc. The melting points of such metallic oxides are equal to or very close to that of the glaze, therefore in the process of melting, the conversion powdered material will fill kin the layer of the glaze or even deposit at the, bottom layer, very seldom will depose on the surface of the glaze layer. Therefore it is not able to effectively convert such far infrared ray in a full scale, and the conversion of the far infrared ray and its operation method is by using the molecules of its element to absorb the external heat energy, and even the heat energy at room temperature. As the temperature increases, it will accumulate the activated energy at its periodical cycle and the vibration energy, and then emit the far infrared ray energy. The light energy emitted from the far infrared ray has a wave of light, and as the traveling line of such radiation obscured by any other substance will elongate the wavelength, or even stop the effective emission. Therefore in order to attain the full scale of emission, the powdered material having the far infrared conversion effect needs to be placed in the outmost external surface.

SUMMARY OF THE INVENTION

Thus, the present invention is using a far infrared powdered material of a higher melting point, and in connection with a color glaze with a lower melting point to let the far infrared conversion powdered material be distribute on the surface of the color glaze. By such arrangement at the outmost surface and more even distribution, it attains the effective emission of the far infrared ray in full scale. This is applicable to the ceramic wares for containing food, flowers, fishes, effective tiles, chair seats, portable health appliances, and the hardware that has a good effect on human blood.

In view of the above description, the inventor of the present invention based on years of experience in the related industry conducted extensive research to enhance the method of coating the far infrared material on the surface of the ceramic wares herein which is hereby submitted for patent application.

Therefore, the primary objective of the present invention is to provide a method of producing a ceramic ware having the effect of a full-scale emission of the far infrared rays.

Another objective of the present invention is to arrange the granules of the far infrared conversion powdered material in such a way that they are larger than the granules of the composed substance of the glaze liquid, so that they can be completely on the outmost surface. It is analogous to the combination of chocolate and the peanuts to form the chocolate bar, as the peanuts always protrude the outmost surface of the chocolate bar.

Another objective of the present invention is to add a heat-absorbing material in the composed substance of the glaze liquid, for example, the heat-absorbing coefficient is higher and there are various natural minerals having the melting point close to that of the composed substance of the gold powder or metal powder. It can increase the heat-absorbing effectiveness, and after the heat only transmitted to the far infrared conversion powdered material, it provides sufficient heat energy to the far infrared conversion powdered material by its absorption as the basis for the high-energy conversion.

In addition, the melting point of the glaze of this invention can be adjusted according to the chemical combination of the composed substances, and there are many ways for doing so. The formation of such far infrared conversion material is mainly by raising the melting point so that it is higher than that of the color liquid. The most fundamental method is to pre-fire the far infrared conversion-powdered material to loosen the element structure for such mineral or attain a high melting-resisting effect under the porous mode.

To make it easier for our examiner to understand the objective of the invention, its performance and advantages, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
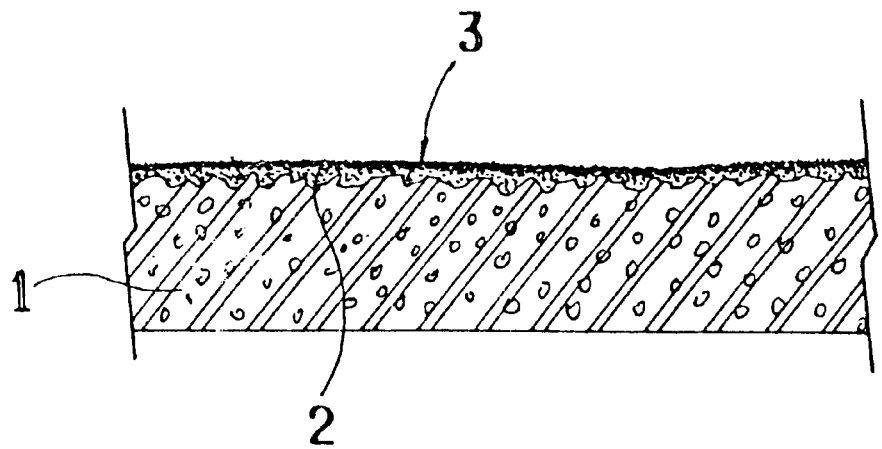
FIG. 1 shows the cross-section of the surface of the ceramic ware according to of a preferred embodiment of the present invention.
Figure 2:
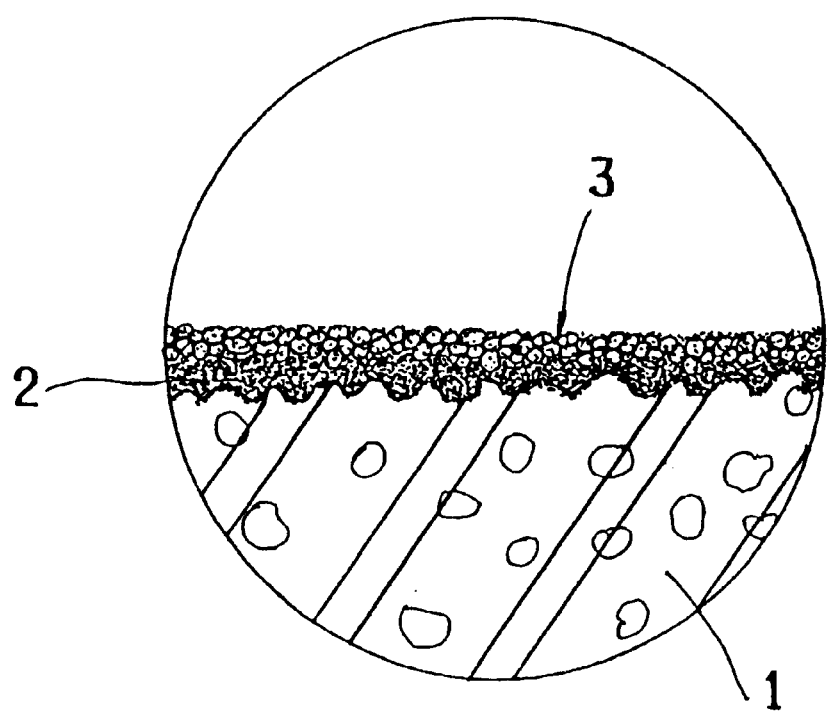
FIG. 2 shows the enlarge diagram of the relative position of the materials when the preferred embodiment is completed according to the present invention.

The present invention mainly consists of a far infrared powdered material which is mixed inside the composed substances substantially composed of a major melting agent and a melting medium. Such far infrared powdered material mainly is a natural mineral, and the major matter of such mineral can emit a radiation very close to the effective fluid wavelength. There are various natural materials for such purpose, and therefore they are not disclosed here any more. Basically, the mineral can emit a far infrared ray with effective wavelength. Its manufacturing method is as follows: water polishing the natural minerals to a smaller size and making the granules to approximately 320 pores per square inch, and drying under the shade, and then firing at about 1280° C. to 1300° C. for 12 hours. It removes the impurities, being fired, and baked into chunks, and then powdered to form the far infrared conversion material. The composed substance 2 of the glaze liquid mainly comprising a major melting agent, and a melting medium, and said major melting agent mainly comprising feldspar and glass powder, and said mainly composed of calcium, carbonate, barium carbonate, zinc oxide, magnesium oxide as the assisting melting agent, and mixed with appropriate amount of kaolin and silicic acid. The proportions of ingredients in the thick glaze liquid are about 50% main melting agent, about 1 to 20% melting medium, about 1 to 20% fire-resisting agent and kaolin, and 10 to 30% silicic acid, and the percentage of the ingredients is set according to the firing temperature and the required conditions. The far infrared powdered material produced after the high-temperature firing and being mixed into the foregoing composed substances of the glaze liquid. Take about 80 to 90% of the composed substances of the glaze liquid and fill in the remaining portion by the far infrared powdered material, and then add 1 to 2 or 1 to 3 unit volume ratio of: liquid water, and proceed with grinding for about 72 hours to form the far infrared liquid. In the operation of implementation, such far infrared liquid is coated on the surface of an unfired ceramic body 1. If it is for the food wares, then the far infrared liquid should be coated on the surface that holds the food; if it is for making tiles, then the far infrared liquid should be coated on the surface of the tile, or the surface of any other objects that need to have a surface of the conversion of ceramic wares. After coating, the melting point of the glaze is lower than that of the far infrared conversion powdered material in the process of firing. During the melting process, it will melt easier than the far infrared conversion powdered material, and such melting produces tiny glass beads and forms glass liquid mode 2. By its internal adherence and flowing ability, the glass liquid will fill in the unfired ceramic body 1 having the porous surface and rough surfaces between crevices. Since the melting point is higher, therefore after the liquid is melted, the far infrared powdered material will suspend or float to the outmost surface. After firing, such glaze liquid will completely melt onto and fully cover the surface of the unfired ceramic body, and will effectively isolate the liquid water, and attain an effect of a smoother surface. Since such far infrared material is pre-fired to make it porous and more difficult to melt simultaneously, therefore before it is fired, it can effectively be deposed on the outmost surface. The far infrared powdered material material 3 as shown in FIG. 2 already float in form of granules on the outmost surface of the glaze liquid 2. The glaze liquid effectively fills the rough pores on the unfired ceramic body. In addition to forming a smooth protective coating on the ceramic surface, it also acts as an interface-combining agent for the surface of the unfired ceramic body and the far infrared conversion powdered material. After conducting the external heat into such far infrared conversion powdered material, its molecules will produce energy waves with periodical cycle and vibration energy and emit far infrared ray energy. It directly has reaction on the outmost surface, and there exists no obstacles around the exterior of the ceramic body. The outmost surface of the ceramic ware has no obstacles to the emission of far infrared rays, and such production method for making ceramic-ware of this kind is the main objective of the present invention.

In summation of the above description, the present invention, of a processing system for identification, production control, and data retrieval herein enhances the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of forming a far infrared radiation material on a surface of ceramic ware, comprising the steps of:
 a) forming a far infrared powder having granules with approximately 320 pores per square inch, drying the far infrared powder and subsequently firing the far infrared powder between 1280° C. and 1300° C. for 12 hours;
 b) forming a glaze including, by volume, approximately 50% melting agent, between 1% and 20% melting medium, between 1% and 20% of fire resisting agent and kaolin and between 10% and 30% silicic acid;
 c) forming a far infrared glaze mixture by mixing the far infrared powder with the glaze whereby the glaze mixture has, by volume, between 80% and 90% of glaze, and whereby the far infrared powder has a higher melting point than the glaze;
 d) adding water to the far infrared glaze mixture in a unit volume ratio of between 1:2 and 1:3 and grinding for approximately 72 hours;
 e) coating the ground far infrared glaze mixture onto a surface of an unfired ceramic body; and,
 f) sintering the coating of the far infrared glaze mixture causing the glaze to melt before the far infrared powder, whereby the infrared powder floats to an outermost surface of the melted glaze.

2. The method of forming a far infrared radiation material on a surface of ceramic ware of claim 1 wherein the melting medium comprises feldspar and glass powder.

* * * * *